United States Patent [19]

Banga

[11] 4,121,281
[45] Oct. 17, 1978

[54] DIRECT CURRENT CONVERTER

[75] Inventor: Julius Banga, Munich, Germany

[73] Assignee: Messerschmitt-Bölkow-Blohm Gesellschaft mit beschränkter Haftung, Munich, Germany

[21] Appl. No.: 838,455

[22] Filed: Oct. 3, 1977

[30] Foreign Application Priority Data

Oct. 23, 1976 [DE] Fed. Rep. of Germany ....... 2648030

[51] Int. Cl.² .......................................... H02M 3/335
[52] U.S. Cl. ........................................ 363/17; 363/58; 363/98; 363/132
[58] Field of Search .................... 363/17, 97, 98, 55, 363/56, 58, 131, 132

[56] References Cited

U.S. PATENT DOCUMENTS

| 3,439,251 | 4/1969 | Schaefer | 363/97 |
| 3,750,003 | 7/1973 | Petersen et al. | 363/56 |
| 3,816,810 | 6/1974 | Friedman et al. | 363/56 X |
| 3,840,798 | 10/1974 | Burchall et al. | 363/17 |

Primary Examiner—William M. Shoop
Attorney, Agent, or Firm—Toren, McGeady and Stanger

[57] ABSTRACT

An improvement in the design of a dc converter with a push-pull oscillator in a bridge connection is disclosed. The design is symmetrical about the bridge diagonal. Each symmetrical half in one bridge branch includes a capacitor and in the other bridge branch includes a transistor switching stage having its control path inductively fed back to the bridge diagonal. The converter is equipped with a transformer having a rectifier on the output side. A choke with center tap is arranged between the transistor switching stages of the symmetrical halves. The bridge diagonal extends from the choke center tap. Other features of the design permit the converter to operate with high input voltages, to safeguard transistor integrity and to function well under low-loss conditions.

5 Claims, 1 Drawing Figure

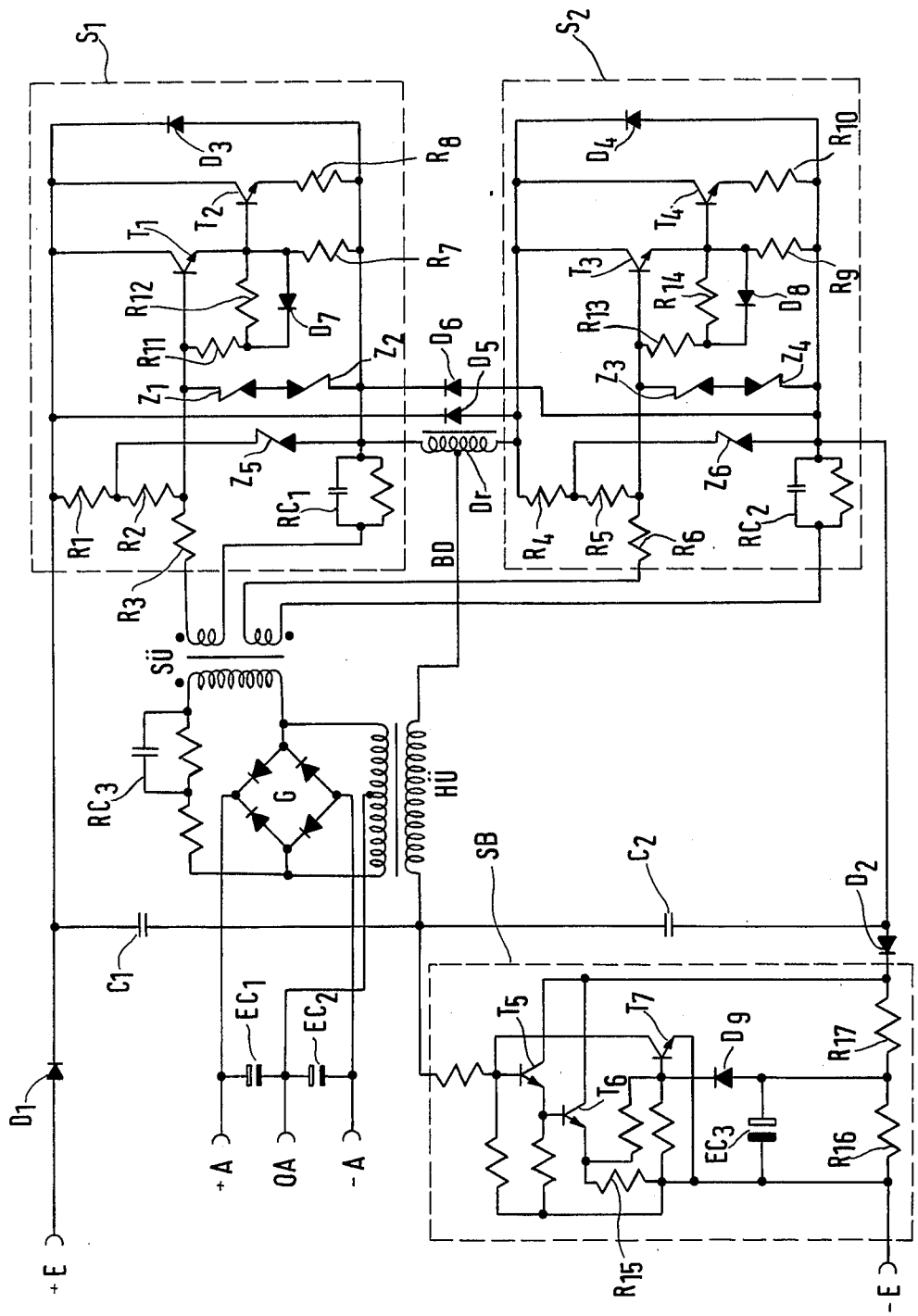

DIRECT CURRENT CONVERTER

FIELD OF THE INVENTION

The invention relates to a direct-current converter with a push-pull oscillator in a bridge connection designed symmetrically to the bridge diagonal, whereby each symmetrical half in one bridge branch has a capacitor and in the other bridge branch has a transistor-switching stage, the control path of which is inductively fed back from the bridge diagonal, which is equipped with a transformer having an output side rectifier.

BACKGROUND OF THE PRIOR ART

A dc converter of this type has been described in detail in DAS No. 1,244,281. Such dc converters operate with relatively minor losses up to about 300 volts. With higher voltages, however, the decisive question is whether during the load alternation from one transistor switching stage of the push-pull oscillator to the other, the closing transistor switching stage is already in a complete-blocking state prior to the starting of the current flow with the opening transistor switching stage. Even minimal overlappings on opening and closing the transistor switching stages result in a short-circuit current flow through both transistor switching stages, which current, under high voltage loads, is correspondingly high and results in the destruction of transistors. Increasing the dwell time between closing and opening the transistor switching stages, however, is connected with a corresponding output loss and therefore represents a drawback.

A primary object of the invention is to solve the above difficulties by providing a dc converter for high input voltages, which operates with minimal additional apparatus input and under low-loss conditions.

BRIEF SUMMARY OF THE INVENTION

In accordance with the invention, in a dc converter with a push-pull oscillator in a bridge connection of a design symmetrical to the bridge diagonal, wherein each symmetrical half in one bridge branch includes a capacitor and in the other branch includes a transistor switching stage, the control path of said stage being inductively fed back from the bridge diagonal, said converter being equipped with a transformer having a rectifier on the output side, the improvement being that between transistor switching stages of the symmetrical halves, a choke with center tap is arranged, the bridge diagonal extending from the choke center tap.

For a better understanding of the present invention, reference is made to the following description and accompanying drawing while the scope of the invention will be pointed out in the appended claims.

BRIEF DESCRIPTION OF THE DRAWING

The sole drawing is a circuit schematic diagram of a dc converter in accordance with the invention.

DETAILED DESCRIPTION OF THE INVENTION

A dc converter according to the present invention is described below with reference to the drawing. The dc converter shown is equipped with a push-pull oscillator in symmetrical bridge connection. Each bridge branch has a capacitor $C_1$ and/or $C_2$, and a transistor switching stage $S_1$ and/or $S_2$. Transistor switching $S_1$ and/or $S_2$ control paths are inductively fed back from a bridge diagonal BD via a control transformer SÜ and a master transformer HÜ. The secondary winding of master transformer HÜ supplies both control transformer SÜ and rectifier G, from which the converted and capacitor-smoothed (by $EC_1$ and EC) direct voltage is picked off. The direct voltage to be converted is applied to the bridge ends $+E$ and $-E$, which applicably are arranged between capacitor $C_1$ and/or $C_2$ and transistor switching stage $S_1$ and/or $S_2$. Diodes $D_1$ and $D_2$ at the input are used for pole-and negative feeder protection. At the lower input, a current limiter SB is provided.

With the shown dc converter according to the invention, the transistor switching stages $S_1$ and $S_2$ are interconnected via a choke Dr, from which center tap the bridge diagonal BD is connected. Transistor switching stages $S_1$, $S_2$ and choke Dr are switched in series so that upon current flow in a bridge branch, a counter voltage is induced by the choke, which acts as an opposing voltage to the transistor switching stage of the other bridge branch. Diodes $D_3$ and $D_4$, which applicably are switched in parallel with the collector-emitter path of transistor switching stages $S_1$ and $S_2$ in a counter-conducting direction, and zener diodes $Z_1$, $Z_2$ and $Z_3$, $Z_4$, which lie series-opposed in pairs and parallel to the base-emitter path of transistor switching stages, are used for limiting the blocking voltage. To accomplish the push-pull action, both secondary windings of control transformer SÜ, which act on the control paths of transistor switching stages $S_1$ and $S_2$, operate in a counter-winding sense. One RC element $RC_1$ and $RC_2$, each being series-switched with the secondary windings of control transformer SÜ, is used for producing a negative base bias and effects a shortening of transistor switching turn-on times. Transistor switching stages $S_1$ and $S_2$ consist of a Darlington stage each with transistors $T_1$, $T_2$ and/or $T_3$, $T_4$, and corresponding resistors $R_1$, $R_2$, $R_3$, and $R_7$, $R_8$ and/or $R_4$, $R_5$, $R_6$ and $R_9$, $R_{10}$ for tuning and establishing the operating point. The Darlington stages have a high amplification factor so that, based on the strong feedback, the oscillator is always brought to operation when connecting the input voltage. On connecting the input voltage, both transistor switching stages $S_1$ and $S_2$ are conducting to a small extent due to zener diodes $Z_5$ and $Z_6$. The current flow subsequently started that way is sufficient to excite the oscillator to the effect that a separate oscillator starting device is not needed. To accelerate the cutout action of Darlington stages, the transistor $T_1$ and $T_2$ and/or $T_3$ and $T_4$ bases are interconnected each via a voltage divider consisting of resistors $R_{11}$, $R_{12}$ and/or $R_{13}$, $R_{14}$ and via a fast switching diode $D_7$ and/or $D_8$. The result is that both base-emitter junctions of a Darlington stage at the instant of cutout, receive a negative signal, which reduces the time of the cutout action.

An RC-element $RC_3$ arranged in the transformer circuit is used substantially for compensating for the phase shifts produced by the inductors.

The current limiter arranged in the bridge branch of the dc converter is arranged and operates as follows:

Under standard operating conditions, the transistor $T_5$ and $T_6$-comprising a Darlington stage is in a conducting state, so that the major part of the input current flows through the Darlington stage and resistor $R_{15}$. When the input current of the dc converter has reached a specified level, the transistor $T_7$ is made to conduct by the voltage drop on resistor $R_{15}$. Then with increasing voltage drop on resistor $R_{15}$, current at an increasing rate is drawn off the base of the Darlington stage via the collector-emitter path of transistor $T_7$, so that current flow and voltage drop on resistor $R_{15}$ are reduced. Thus, a closed control circuit is produced, which insures a constant input current on the dc converter. The level of the input current can be adjusted by resistor $R_{15}$. If the voltage drop on the Darlington stage exceeds a specified value, e.g., by a further reduction of the load resistance at the output or a voltage rise at the input of the dc converter, then a voltage rise is produced at the base of transistor $T_7$ by voltage divider $R_{16}$, $R_{17}$, switched in parallel with the Darlington stage, and by diode $D_9$ after a time determined by capacitor $EC_3$. Accordingly, the transistor $T_7$ draws current off the base of Darlington stage $T_5$, $T_6$ at an increased rate, which results in a further voltage drop at the Darlington stage, etc; the current limiter then completely blocks the operating current except for a minor amount and opens up only if the current consumption is completely reduced or current supply is temporarily cut off.

As intended above, the problem of the prior art has been solved according to the invention in that, between transistor switching stages of both symmetrical halves, a choke with a center tap is arranged, from the latter of which the bridge diagonal extends. A choke arranged that way produces a low-loss alternate-current load and, during the critical transistor-switch-over period opposes large D.C. current changes, due to the generated back e.m.f. inductive voltage appearing in series. In this manner, an overflow of short-circuit current from one transistor switching stage to the other is prevented.

According to a further development of the invention, the choke ends are connected to the bridge branch and arranged opposite to said ends via freewheeling diodes so that the operation of transistor switching stages is not blocked by the choke.

A specifically advantageous type of a tested feature is to equip each transistor switching stage with a Darlington stage, and, according to an advanced development of the invention to connect the base of the first Darlington stage transistor to the base of the second Darlington stage transistor via a diode and resistor network which is switched opposite to the base-emitter paths. Then, on cutoff, both base-emitter paths of a Darlington stage receive a negative signal, so that the cutoff action is particularly accelerated. Because the blocking voltage is distributed over both Darlington stage transistors, its total applied voltage can be set higher than when using only one transistor for the switching stage. Additionally, the switching time is cut short by a higher blocking voltage.

If, according to a further improvement of the invention, the transistor switching control paths each are equipped with a time-lag element for producing a negative base bias, then the ascending slopes of transistor switching pulses become steeper and that way the critical change-over times shorter.

A particularly safe and short-circuit-free type of dc converter is produced according to the invention by equipping the bridge input with a current limiter.

While there have been described and shown different embodiments of the present invention, this specification is intended to cover all the modifications and variations that come within the true spirit and scope of the present invention.

What is claimed is:

1. In a dc converter with a push-pull oscillator in a bridge connection of a design symmetrical to the bridge diagonal, wherein each symmetrical half in one bridge branch includes a capacitor and in the other bridge branch includes a transistor switch stage, the control path of which is inductively fed back from the bridge diagonal, said converter being equipped with a transformer having a rectifier on the output side, the improvement being that between transistor switching stages of the symmetrical halves, a choke with a center tap is arranged, the bridge diagonal extending from the choke center tap.

2. A dc converter according to claim 1, wherein both ends of said choke are connected to the applicably opposite bridge branch via freewheeling diodes.

3. In a dc converter with a push-pull oscillator in a bridge connection of a design symmetrical to the bridge diagonal, wherein each symmetrical half in one bridge branch includes a capacitor and in the other bridge branch includes a transistor switching stage, the control path of which is inductively fed back from the bridge diagonal, said converter being equipped with a transformer having a rectifier on the output side, the improvement being that between transistor switching stages of the symmetrical halves, a choke with a center tap is arranged, the bridge diagonal extending from the choke center tap, wherein each of the transistor switching stages includes a Darlington stage and wherein the base of the first transistor of each Darlington stage is connected to the base of the second Darlington stage transistor via a diode and resistor network which is switched opposite to the base-emitter paths.

4. A dc converter according to claim 1, wherein each of the control paths of said transistor switching stages includes a time-lag element for producing a negative bias.

5. A dc converter according to claim 4, wherein the bridge input includes a current limiter.

* * * * *